(12) United States Patent
Gretz (10) Patent No.: US 7,582,827 B1
(45) Date of Patent: Sep. 1, 2009

(54) ADJUSTABLE ELECTRICAL BOX FOR FLUSH OR OFFSET MOUNTING OF ELECTRICAL DEVICES ON BRICK OR STONE WALLS

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 247 days.

(21) Appl. No.: 11/821,730

(22) Filed: Jun. 25, 2007

(51) Int. Cl.
*H02G 3/08* (2006.01)

(52) U.S. Cl. .................. 174/50; 174/481; 174/57; 174/58; 220/3.2; 220/3.3; 248/906

(58) Field of Classification Search .......... 174/480, 174/481, 50, 53, 57, 58, 64, 135, 63, 535, 174/61; 220/3.2–3.9, 4.02; 248/906; 439/535; 33/528; 361/600, 601
See application file for complete search history.

(56) References Cited

U.S. PATENT DOCUMENTS

| | | | |
|---|---|---|---|
| 2,736,450 A | 2/1956 | Atkinson | |
| 4,693,438 A | 9/1987 | Angell | |
| 5,042,673 A | 8/1991 | McShane | |
| 5,117,996 A * | 6/1992 | McShane | 174/57 |
| 5,722,208 A * | 3/1998 | Humphrey et al. | 174/53 |
| 6,642,447 B1 | 11/2003 | Mailloux | 174/50 |
| 6,737,576 B1 * | 5/2004 | Dinh | 174/50 |
| 6,998,531 B2 * | 2/2006 | Hull | 174/50 |
| 7,087,837 B1 | 8/2006 | Gretz | |
| 7,117,591 B1 | 10/2006 | Gretz | |
| 7,132,601 B1 * | 11/2006 | Seff | 174/50 |
| 7,388,162 B1 * | 6/2008 | Gretz | 174/481 |
| 7,462,775 B1 * | 12/2008 | Gretz | 174/50 |

* cited by examiner

*Primary Examiner*—Angel R Estrada (57) ABSTRACT

An adjustable electrical box assembly for providing electrical service on a brick or stone wall. The assembly includes a base member, anchoring members, and an electrical box. The base member includes sidewalls with a plurality of outward extending tabs and a top wall with a forward extending lip. The anchoring members are substantially L-shaped with a first leg for anchoring against the substrate of a structure and a second leg for securing to the sidewalls of the base member. The electrical box assembly enables easy mounting and leveling of an electrical fixture either flush with or at some predetermined offset from a brick or stone wall.

14 Claims, 12 Drawing Sheets

Fig. 19

ADJUSTABLE ELECTRICAL BOX FOR FLUSH OR OFFSET MOUNTING OF ELECTRICAL DEVICES ON BRICK OR STONE WALLS

FIELD OF THE INVENTION

This invention relates to electrical junction boxes and specifically to an adjustable electrical box assembly that enables mounting an electrical device to a brick or stone wall in a flush or offset configuration depending on the homeowner's preference.

BACKGROUND OF THE INVENTION

Electrical boxes are commonly installed on the exterior walls of buildings to provide outdoor electrical service. Mounting a conventional electrical box is typically an easy task in exterior walls that are constructed of wood siding, vinyl siding, stucco, or or similar types of wall coverings. With these types of wall coverings, wall studs are typically exposed or easily accessible and offer a convenient support to which a conventional outlet box can be secured with mounting fasteners such as nails or screws.

It is more difficult to install a conventional electrical box on a wall that is constructed of brick or stone. Although the discussion henceforth will be discussed with regard to brick walls, it should be understood that the electrical box of the present invention is applicable to both brick and stone walls.

The standard method of installing electrical service to a brick wall is to mortar in a conventional plastic or conventional metal box with the wiring installed. Typically the gap between the circumference of the box and the stone/brick is filled with mortar. The cement around the periphery is typically visible from the front of the conventional box, and this typically detracts from the attractiveness of the installed box. Additionally, as a result of using only cement to secure the box, it is difficult to level the box with respect to the outer surface of the brick wall.

The conventional electrical box is typically mounted with the rear surface of the box flush with the wall substrate. There is no arrangement on the conventional box to adjust the distance the box extends outward from the brick surface. The utility of the electrical box, including the accessibility to the electrical fixtures installed thereto, is enhanced if it is set at the desired offset distance with respect to the wall.

A further problem arises as the result of the smooth outer sidewalls of the conventional electrical box as there is no structure on the outer surface of the sidewalls for holding the electrical box fast within the mortar.

What is needed therefore is an electrical box for exterior brick or stone walls that may be securely anchored to the wall with fasteners, is easily leveled with respect to the wall, is capable of being mounted flush with the wall or at some predetermined offset with respect to the wall, and that provides an aesthetically pleasing installation.

SUMMARY OF THE INVENTION

The invention is an adjustable electrical box assembly for providing electrical service on a brick or stone wall. The assembly includes a base member, anchoring members, and an electrical box. The base member includes sidewalls with a plurality of outward extending tabs and a top wall with a forward extending lip. The anchoring members are substantially L-shaped with a first leg for anchoring against the substrate of a structure and a second leg for securing to the sidewalls of the base member. The electrical box includes rearward extending sidewalls. The outward extending tabs of the base member provide a gap for receiving and guiding the second leg of the anchoring member there between. A plurality of apertures is provided within the gap of the base member and an elongated slot is provided in the second leg of the anchoring members. The base member may be secured to a hole in a brick or stone wall at a predetermined offset to the wall by securing fasteners through the second leg of the anchoring members and into the appropriate apertures in the base member, and then securing the first leg to the substrate exposed by the hole. Mortar is then applied to the gap between the wall and the sidewalls of the base member. The electrical box is then secured to the base member with the rearward extending sidewalls of the electrical box received within the forward extending lip of the base member. The electrical box is adapted to receive a light fixture or similar electrical device.

OBJECTS AND ADVANTAGES

Several advantages are achieved with the adjustable electrical box assembly of the present invention, including:
 (1) The adjustable electrical box assembly of the present invention enables the mounting of electrical devices either flush or at a predetermined offset with respect to a brick or stone wall.
 (2) The adjustable electrical box assembly includes anchoring members and fasteners that enable mounting of the box assembly to the wall substrate rather than anchoring merely with cement as in conventional electrical boxes.
 (3) The plurality of anchoring members enables easy leveling of the electrical box with respect to the wall surface. If the substrate is rough or uneven, each of the four anchoring members can be adjusted individually with respect to the electrical box, thereby making it easy to obtain an installed box that is level with respect to the outer wall.
 (4) The adjustable electrical box assembly of the present invention provides enhanced anchoring of mortar when it is used to fill around the base of the assembly. The adjustable electrical box assembly includes a plurality of tabs extending outwardly from the base member portion of the assembly to provide enhanced adherence to mortar.
 (5) The outlet box and adapter of the present invention provides an aesthetically pleasing electrical box for mounting an electrical device to the exterior of a brick or stone wall.

These and other objects and advantages of the present invention will be better understood by reading the following description along with reference to the drawings.

TABLE OF NOMENCLATURE

The following is a listing of part numbers used in the drawings along with a brief description:

| Part Number | Description |
|---|---|
| 20 | adjustable electrical box assembly |
| 22 | base member |
| 24 | anchoring member |
| 26 | electrical box |
| 28 | sidewall of base member |
| 30 | tab |
| 32 | top wall of base member |
| 34 | lip |
| 36 | gap |
| 38 | aperture |
| 40 | inner periphery of lip |
| 42 | inner edge of lip |
| 44 | outer edge of lip |
| 46 | boss in base member |
| 48 | bore |
| 50 | peripheral flange of electrical box |
| 52 | sidewalls of electrical box |
| 54 | back wall of electrical box |
| 56 | electrical enclosure |
| 58 | boss in electrical box |
| 60 | bore |
| 62 | aperture in back wall of electrical box |
| 64 | apron |
| 66 | outer edge of peripheral flange |
| 68 | removable wall section |

-continued

| Part Number | Description |
|---|---|
| 70 | knockout |
| 72 | base leg |
| 74 | side leg |
| 76 | base slot |
| 78 | slot |
| 80 | first attachment arrangement |
| 82 | fastener |
| 84 | second attachment arrangement |
| 86 | fastener |
| 88 | hole in wall |
| 90 | brick wall |
| 92 | substrate |
| 94 | third attachment arrangement |
| 96 | fastener |
| 98 | mortar |
| 100 | rear edge of the base member |
| 102 | light fixture |
| 104 | bracket |
| 106 | nut |
| 108 | fastener |
| 110 | post |
| D1 | distance of offset of electrical box from wall |

DETAILED DESCRIPTION OF THE INVENTION

Figure 1:
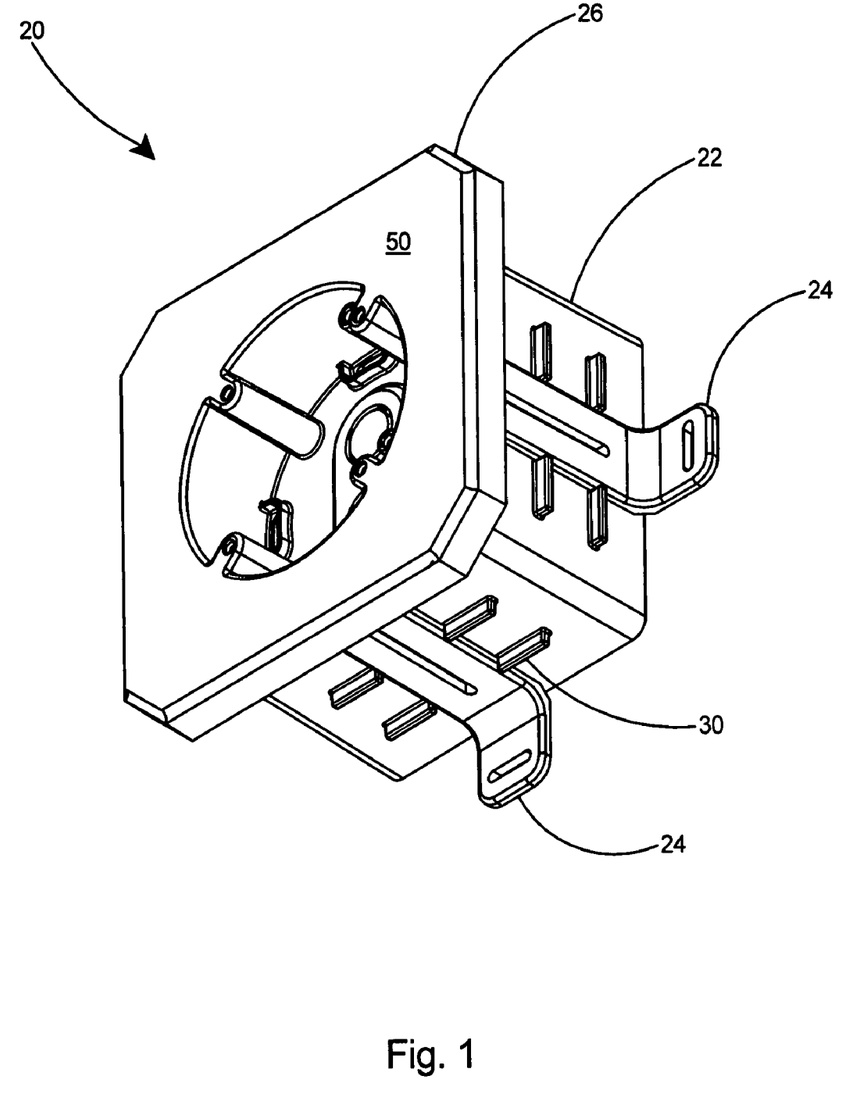
FIG. 1 is a perspective view of a preferred embodiment of an adjustable electrical box assembly according to the present invention.

With reference to the preferred embodiment of FIG. 1, the present invention is an adjustable electrical box assembly 20 including a base member 22, one or more anchoring members 24, and an electrical box 26. The adjustable electrical box assembly 20 can be used to mount an electrical device to a brick or stone wall (not shown), either flush with the wall or at a predetermined offset based on the user's preference.

Figure 2:
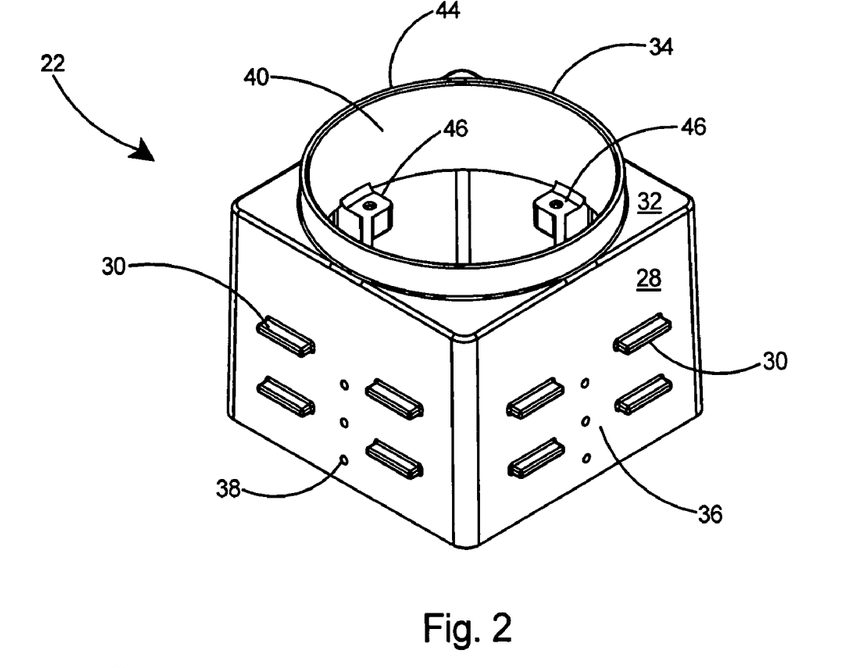
FIG. 2 is a perspective view of the base member portion of the adjustable electrical box assembly of FIG. 1.
Figure 3:
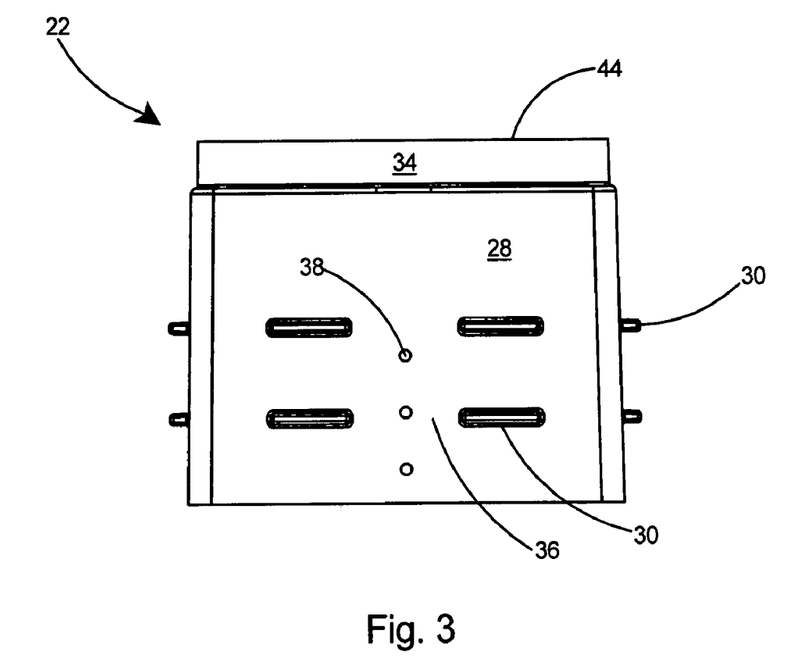
FIG. 3 is a side view of the base member of FIG. 2.

Referring to FIGS. 2 and 3, the base member 22 includes sidewalls 28, a plurality of outward extending tabs 30, a top wall 32, and a lip 34 extending from the top wall 32. The outward extending tabs 30 are arranged in pairs along each sidewall 28 of the base member 22 thereby defining a gap 36 there between. A plurality of apertures 38 is provided in linear alignment longitudinally along the sidewall 28 of the base member 22 within the gap 36. The lip 34 includes an inner periphery 40, an inner edge 42, an outer edge 44, and a plurality of bosses 46 along the inner periphery 40 of the base member 22 at the inner edge 42 of the lip 34.

Figure 4:
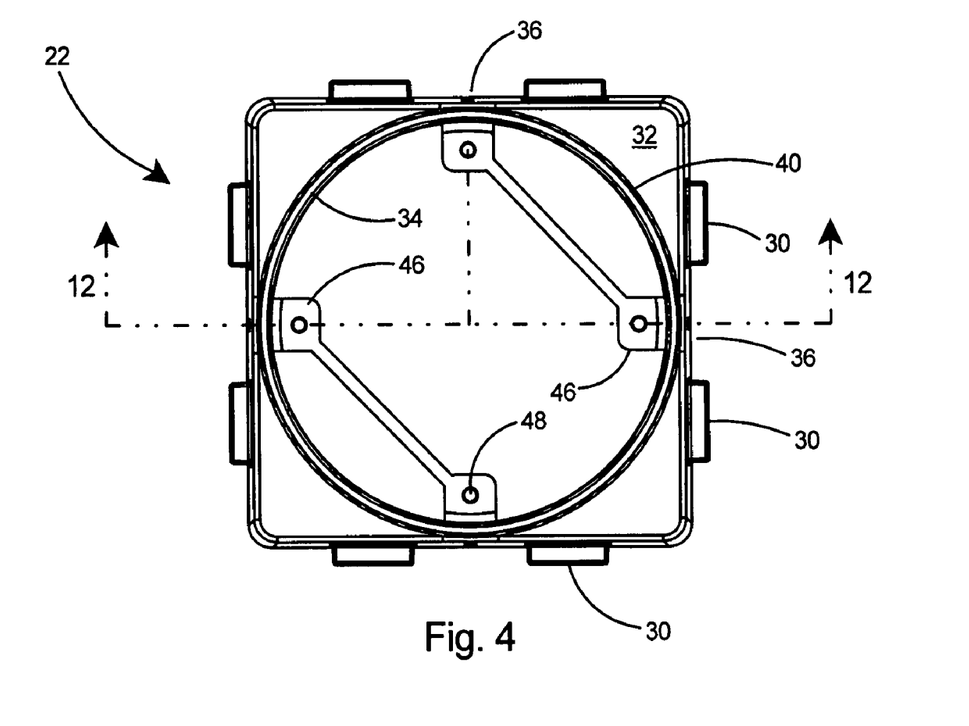
FIG. 4 is a top view of the base member of FIG. 2.

As shown in FIG. 4, the preferred embodiment of the base member 22 includes four bosses 46 including bores 48 therein spaced 90° apart around the inner periphery 40 of the forward extending lip 34. The tabs 30 extend outwardly from the sidewalls 28 of the base member 22.

Figure 5:
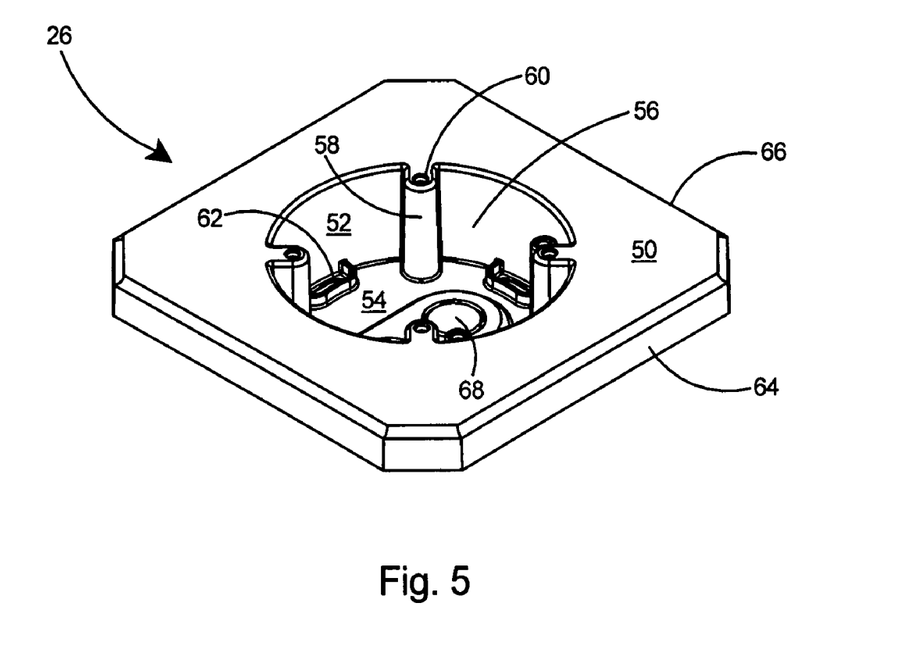
FIG. 5 is a perspective view of the electrical box portion of the adjustable electrical box assembly of FIG. 1.
Figure 6:
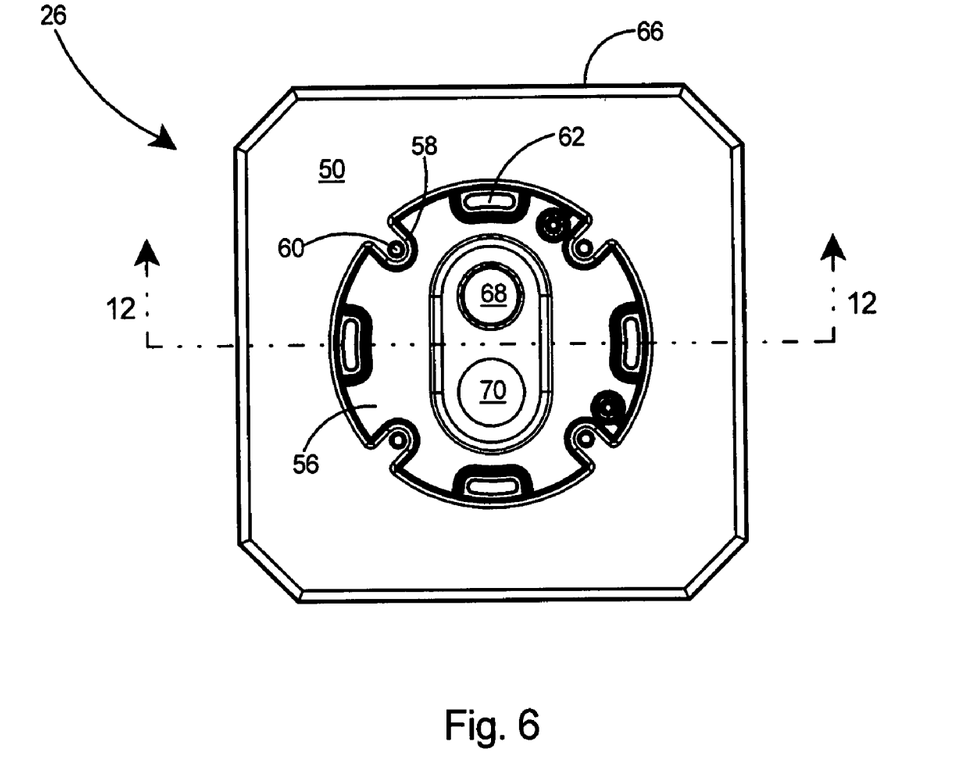
FIG. 6 is a top view of the electrical box of FIG. 5.
Figure 7:
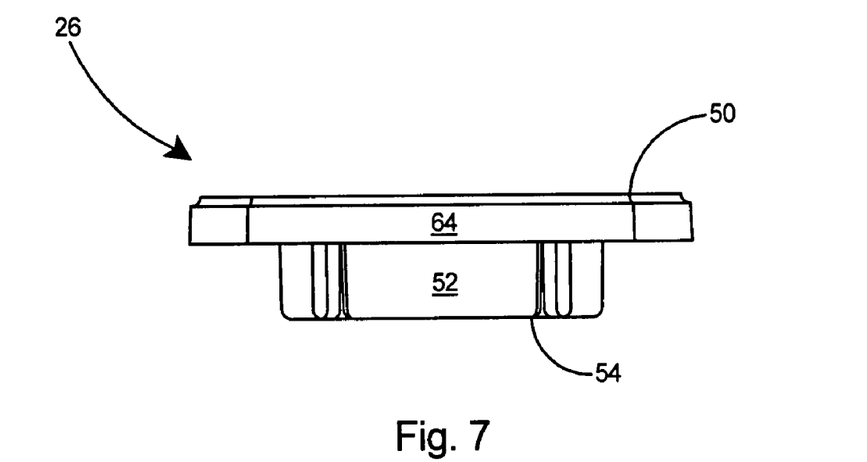
FIG. 7 is a side view of the electrical box of FIG. 5.
Figure 8:
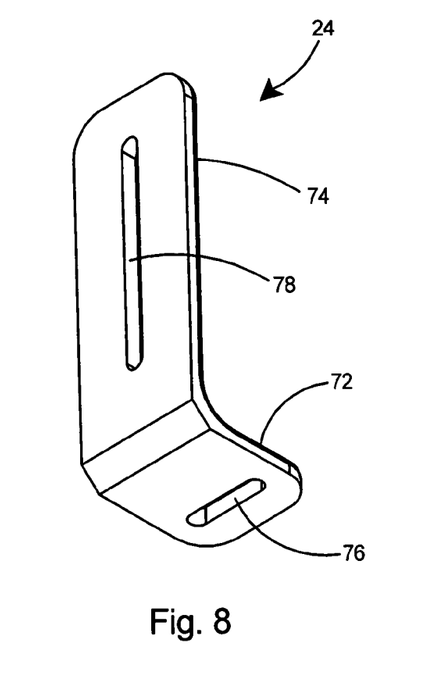
FIG. 8 is a perspective view of one of the anchoring members that forms a portion of the adjustable electrical box assembly of FIG. 1.
Figure 9:
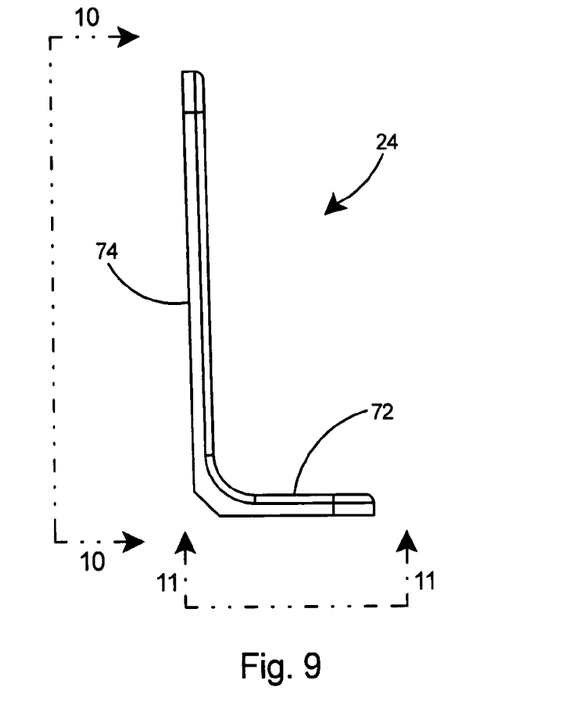
FIG. 9 is a side view of the anchoring member of FIG. 8.
Figure 10:
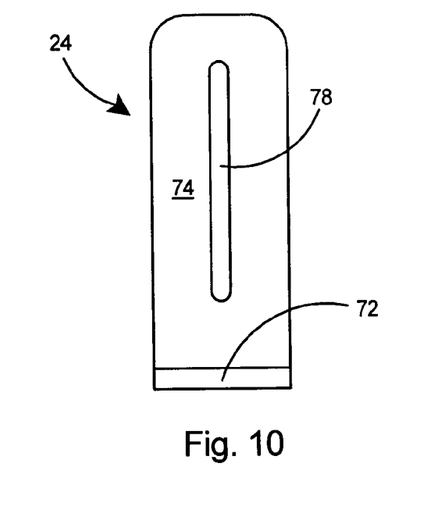
FIG. 10 is an end view of the anchoring member taken along line 10-10 of FIG. 8.
Figure 11:
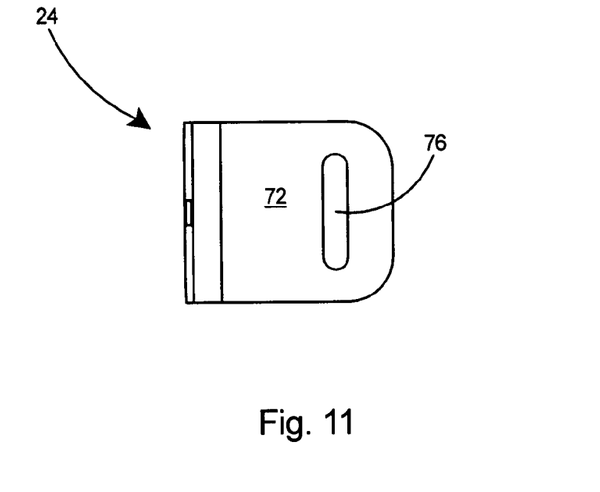
FIG. 11 is an end view of the anchoring member taken along line 11-11 of FIG. 8.

With reference to FIGS. 5-7 there is shown an electrical box 26 that forms a portion of the adjustable electrical box assembly of the present invention. The electrical box 26 includes a peripheral flange 50 and sidewalls 52 extending rearwards from the peripheral flange 50 to a back wall 54. The sidewalls 52 and back wall 54 define an electrical enclosure 56 therein that will later accommodate wiring for an electrical device (not shown). Bosses 58, each including a bore 60 therein, are integral with and extend from the inner periphery of the sidewalls 52. The electrical box 26 further includes apertures 62 in the back wall 54. As shown in FIGS. 5 and 7, the electrical box 26 includes an apron 64 that is integral with and extends rearward from the outer edge 66 of the peripheral flange 50. One or more removable wall sections 68 are provided in the back wall 54 of the electrical box 26, the removable wall sections 68 when removed there from thereby forming knockouts 70 (see FIG. 6) in the back wall 54 of the electrical box 26.

Referring to FIGS. 8-11, the anchoring member 24 is substantially L-shaped and includes a base leg 72 and a side leg 74. The base leg 72 includes a base slot 76 arranged laterally therein and the side leg 74 includes a slot 78 arranged longitudinally therein. The anchoring member 24 may be constructed of plastic or metal.

Figure 12:
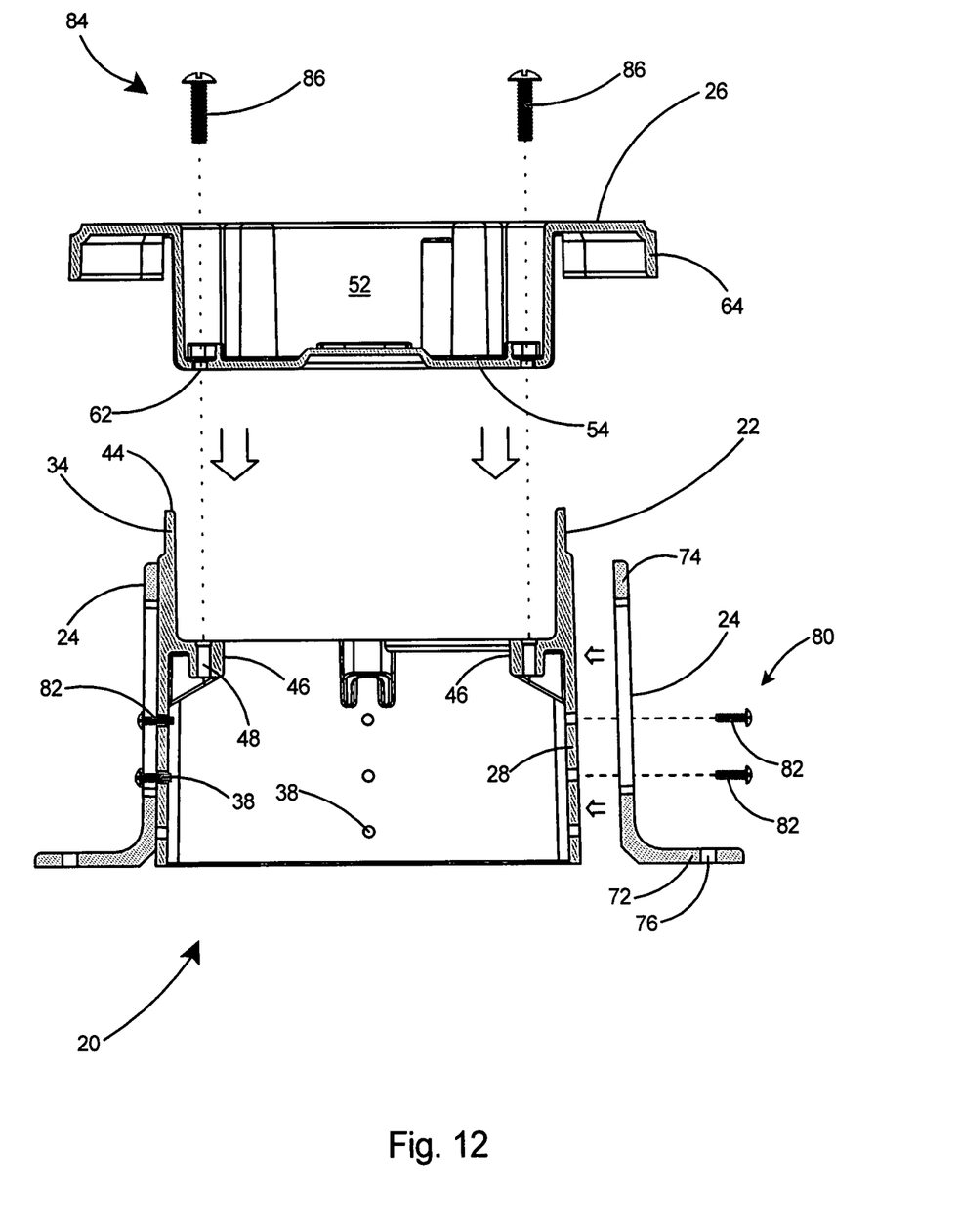
FIG. 12 is a sectional view of the electrical box taken along line 12-12 of FIG. 6 and a sectional view of the base member taken along line 12-12 of FIG. 4 with the electrical box in alignment with the base member and attached anchoring members to be joined thereto.

With reference to FIG. 12 there is shown an electrical box 26 exploded away from and in alignment with a base member 22 to be secured thereto in order to form an adjustable electrical box assembly 20 according to the present invention. The sidewalls 52 of the electrical box 26 are telescopically received within the lip 34 of the base member 22. The adjustable electrical box assembly 20 includes a first attachment arrangement 80 for securing each anchoring member 24 to the base member 22. The first attachment arrangement 80 includes one or more fasteners 82 for securing the anchoring member 24 to the sidewall 28 of the base member 22. The distance of the base leg 72 from the outer edge 44 of the lip 34 may be varied and selected to arrange for mounting the electrical box 26 flush with a wall (not shown) or at some desired offset from a wall.

Figure 13:
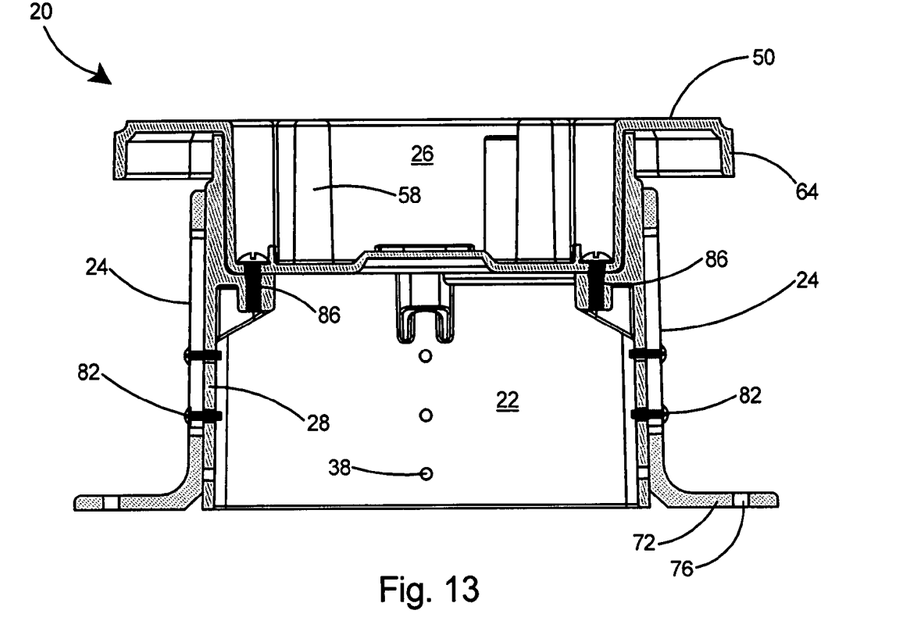
FIG. 13 is a sectional view of the electrical box, base member, and anchoring members of FIG. 12 after being secured together to form the adjustable electrical box assembly of the present invention.

As shown in FIG. 12, the adjustable electrical box assembly 20 includes a second attachment arrangement 84 for securing the electrical box 26 to the base member 22. The second attachment arrangement 84 includes fasteners 86 for securing through the apertures 62 in the back wall 54 of the electrical box 26 into the bosses 46 of the base member 22. FIG. 13 depicts the adjustable electrical box assembly 20 in the assembled state, after the anchoring members 24 have been secured to the base member 22 and the electrical box 26 has been secured to the base member 22.

Figure 14:
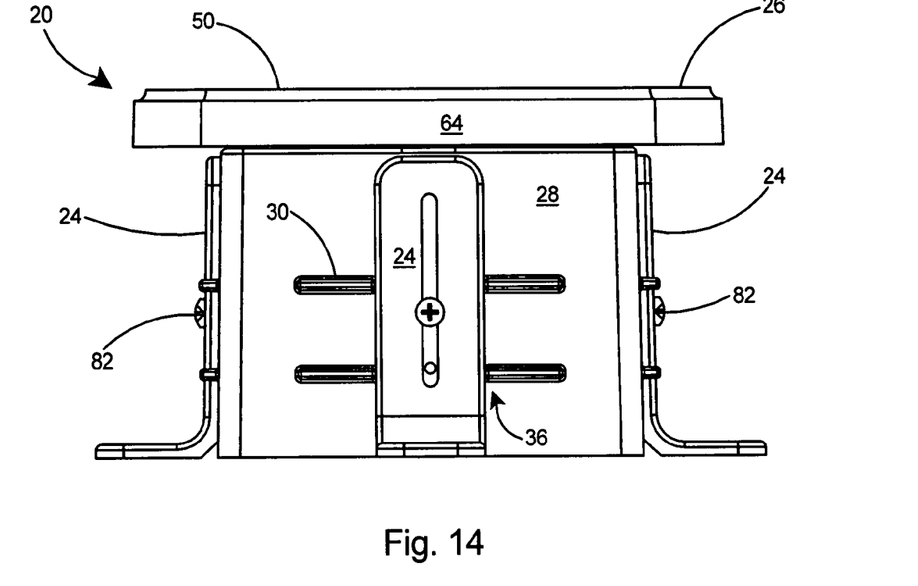
FIG. 14 is a side view of the adjustable electrical box assembly of FIG. 13.
Figure 15:
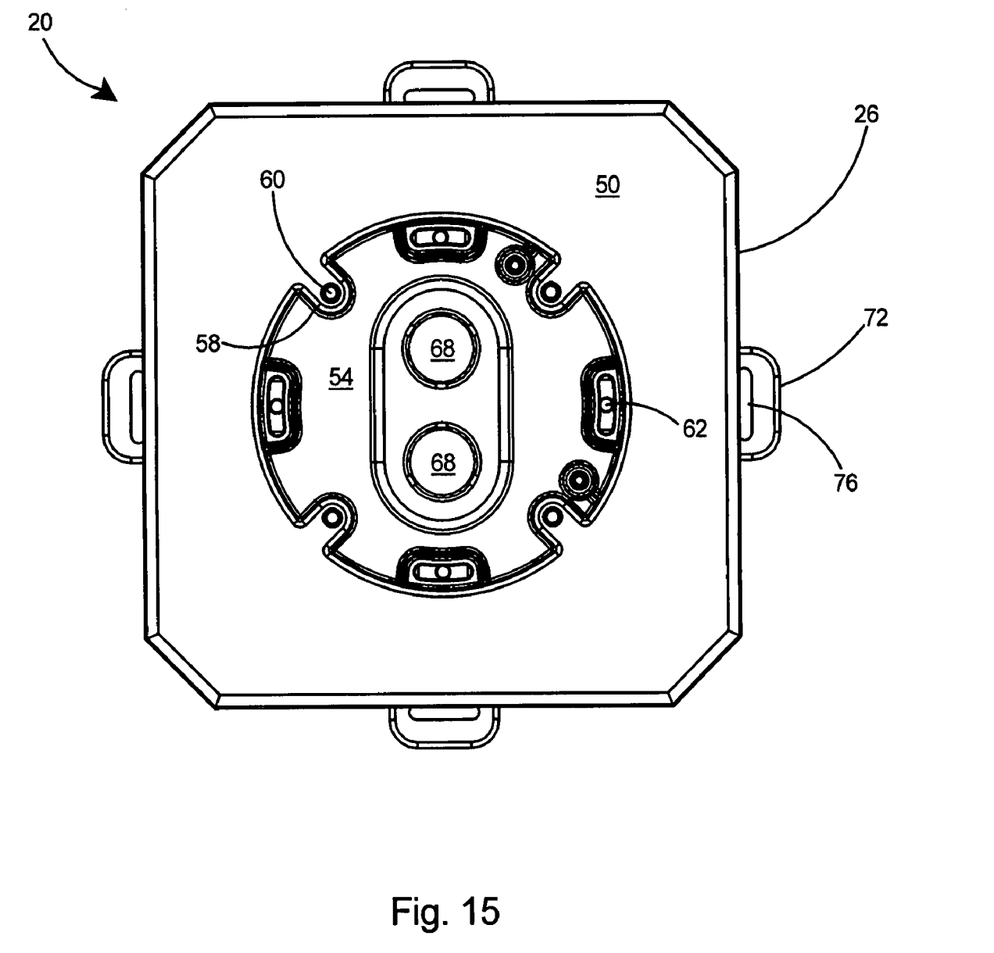
FIG. 15 is a top view of the adjustable electrical box assembly of FIG. 13.

As shown in FIG. 14, the anchoring member 24 is slideable within the gap 36 that is defined by the spaced apart tabs 30. When the adjustable electrical box assembly 20 has been fully assembled as shown in FIGS. 14 and 15, the peripheral flange 50 of the electrical box 26 extends laterally substantially beyond the sidewalls 28 of the base member 22 and obscures a substantial portion of the sidewalls 28 and the anchoring members 24 from view.

Figure 16:
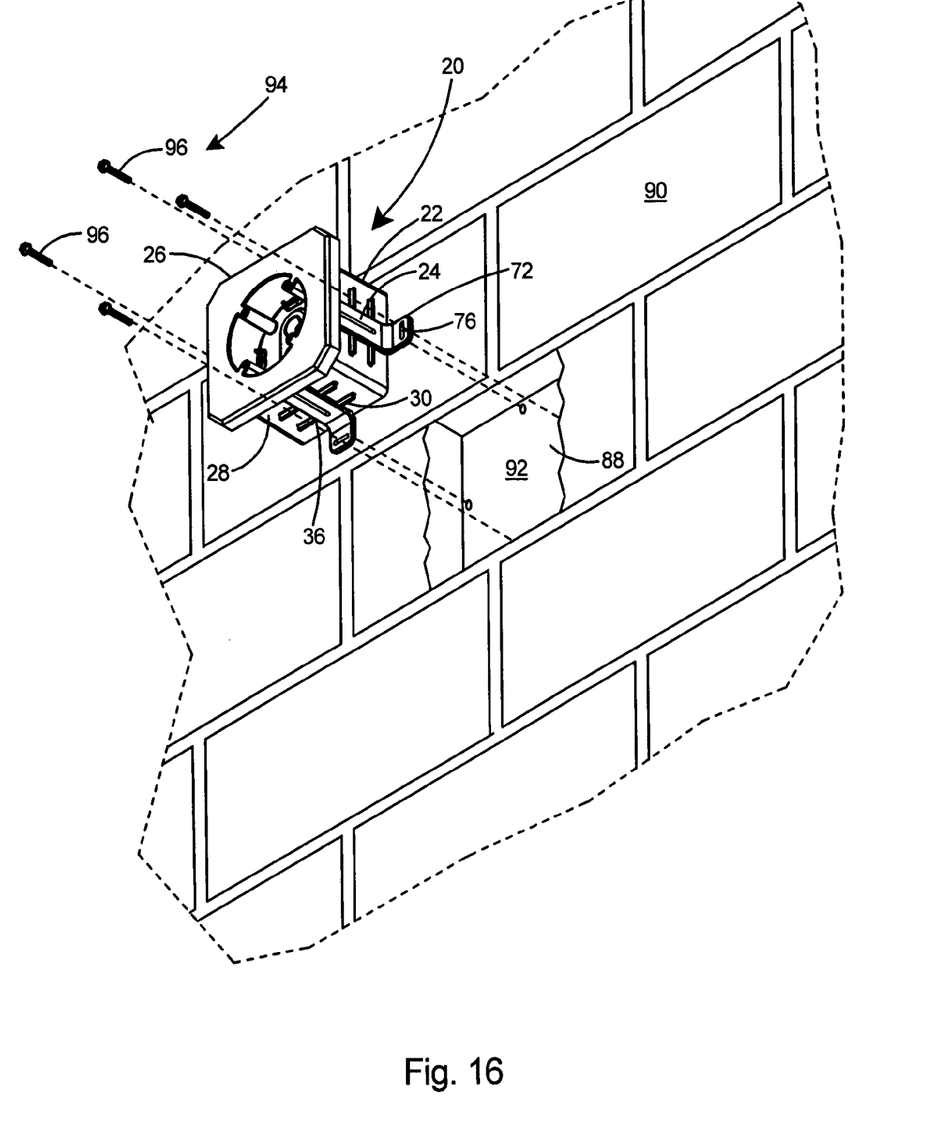
FIG. 16 is a perspective view of the preferred embodiment of the adjustable electrical box assembly according to the present invention exploded away from and in alignment to be inserted in a hole in a brick wall.

With reference to FIG. 16, the adjustable electrical box assembly 20 of the present invention is placed in operation by first creating a hole 88 in a stone or brick wall 90 to expose the substrate 92 which is typically formed of plywood or similar substrate material. A third attachment arrangement 94 includes fasteners 96 which cooperate with the base legs 72 and base slots 76 of the anchoring members 24 to secure the adjustable electrical box assembly 20 to the substrate 92. As described herein above, prior to securing the assembly to the wall the anchoring members 24 can be slid within the gaps 36 defined by the outward extending tabs 30 and secured in a user selected position within the gap 36. Thus, the user can set the offset of the electrical box 26 with respect to the wall 90 by selecting the position of the anchoring members 24 with respect to the base member 22. FIG. 16 depicts the anchoring members 24 set as far forward as possible with respect to the base member 22 which sets the electrical box 26 flush against the wall assuming the depth of the hole 88 is greater than the depth of the sidewalls 28. Conversely, the anchoring members 24 can be slid backward with respect to the sidewalls 28 and secured thereto, in which case the electrical box 26 will be offset with respect to the wall 90. The position of the anchoring members 24 with respect to the sidewalls 28 of the base member determines the amount of offset from the wall 90.

Figure 17:
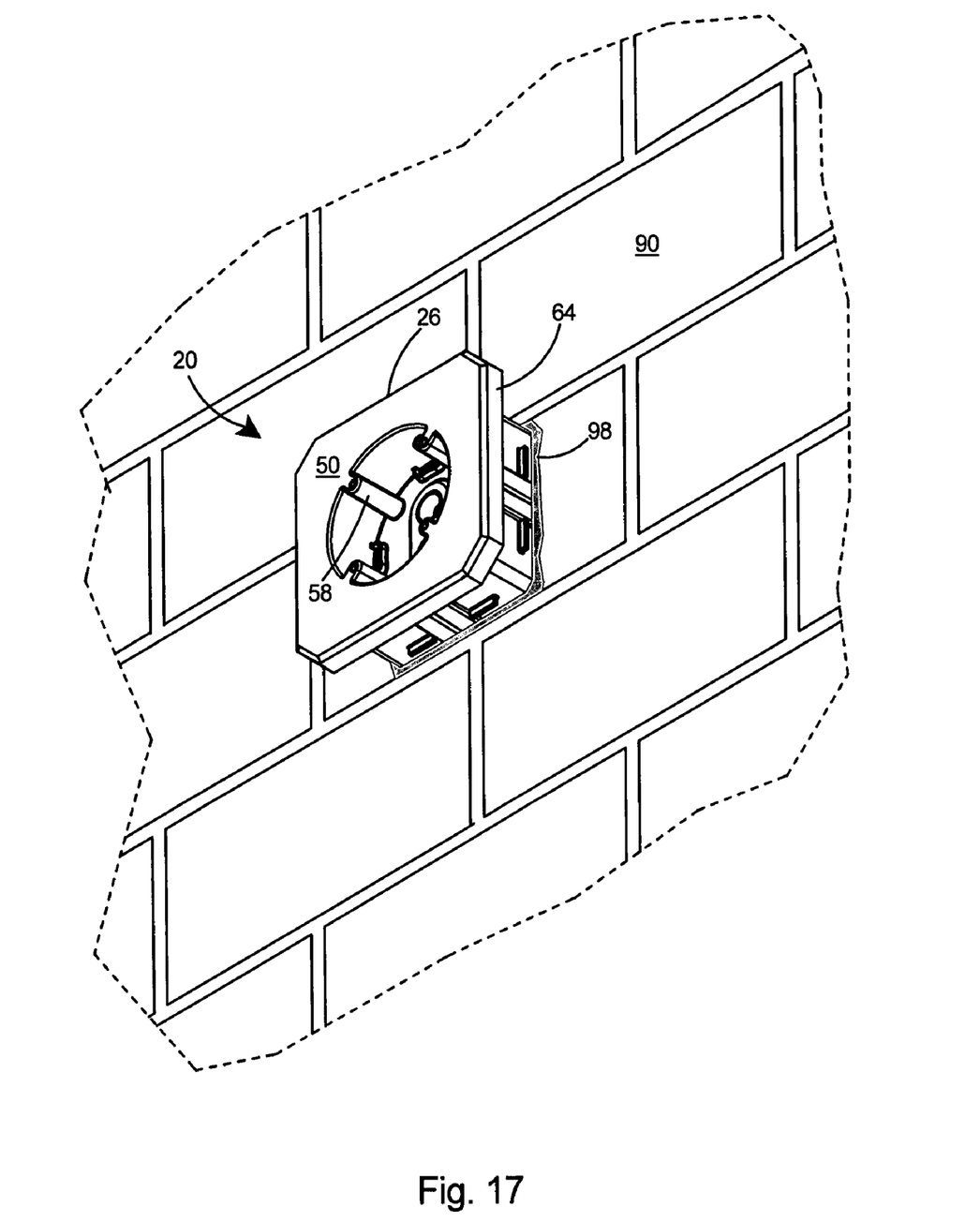
FIG. 17 is a perspective view of the preferred embodiment of the adjustable electrical box assembly according to the present invention after being secured to a brick wall.

FIG. 17 depicts an adjustable electrical box assembly 20 according to the present invention after being secured to a brick wall 90. As shown in FIG. 17, the electrical box has been installed at an offset from the wall. Mortar 98 has been used to fill the hole surrounding the adjustable electrical box assembly 20.

Figure 18:
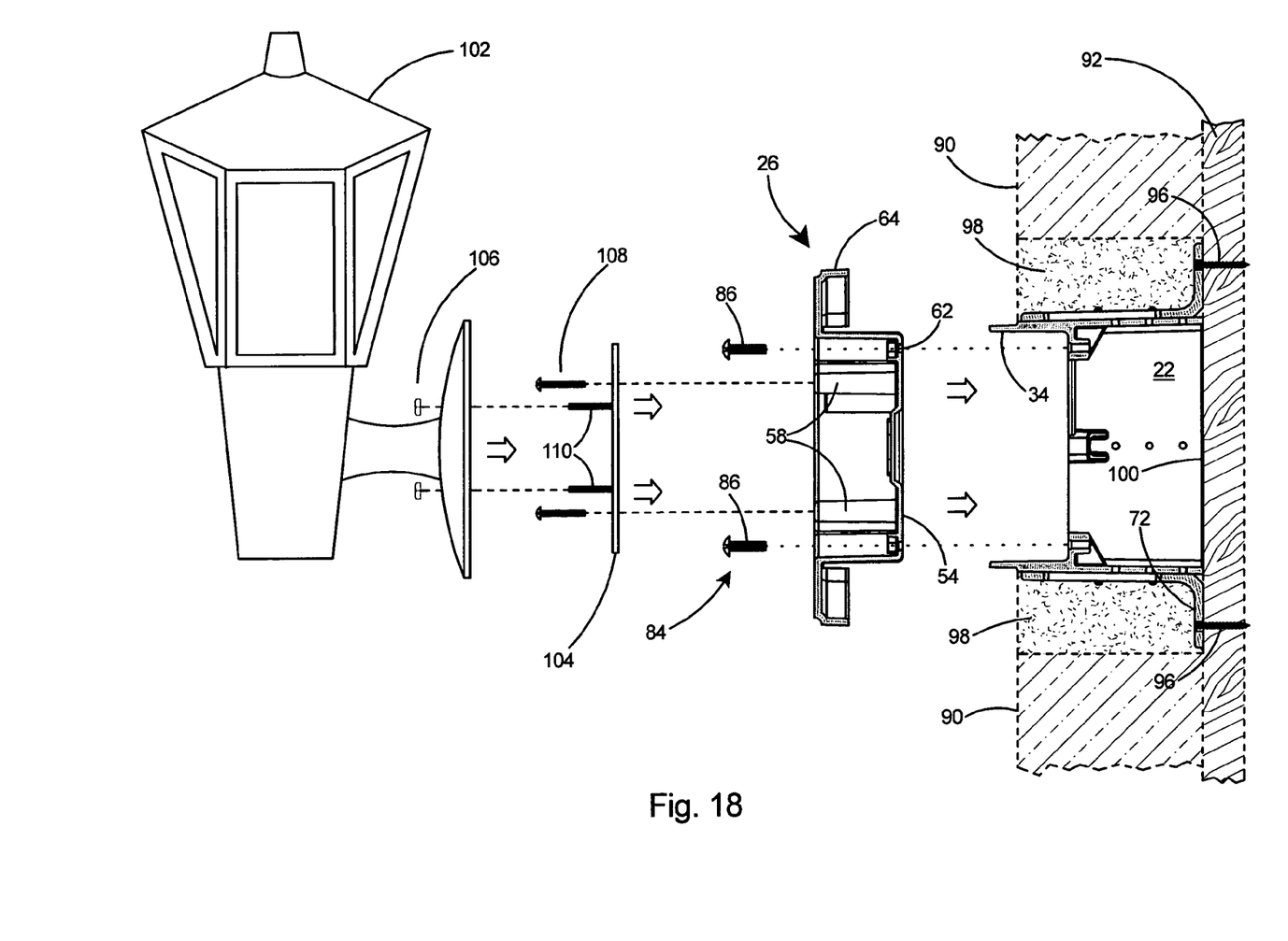
FIG. 18 is a side view of the electrical box exploded away from and in alignment with the base member and anchoring members to be secured thereto and a light fixture in alignment with the adjustable electrical box assembly according of the present invention to be secured thereto.

With reference to FIG. 18, an electrical box 26 is shown in alignment with a base member 22 that has been secured to a substrate 92 by fasteners 96 secured through the anchoring members 24. Mortar 98 is applied to fill the spaced between the base member 22 and the brick wall 90. In FIG. 18, the anchoring members 24 have been secured to the base member 22 in the most forward position with respect to the base member 22, thereby placing the base legs 72 flush with the rear edge 100 of the base member 22. The electrical box 26 will therefore be secured flush with the brick wall 90 with the rear of the apron 64 in contact with the wall 90. An electrical device, such as a light fixture 102, is secured to the adjustable electrical box assembly 20 using the complementary bracket 104 and nuts 106 supplied with the light fixture 102. The bores 60 in the bosses 58 of the electrical box 26 are capable of receiving fasteners 108 for securing the bracket 104 to the electrical box 26. The nuts 106 thread onto posts 110 that extend from the light fixture bracket 104.

Figure 19:
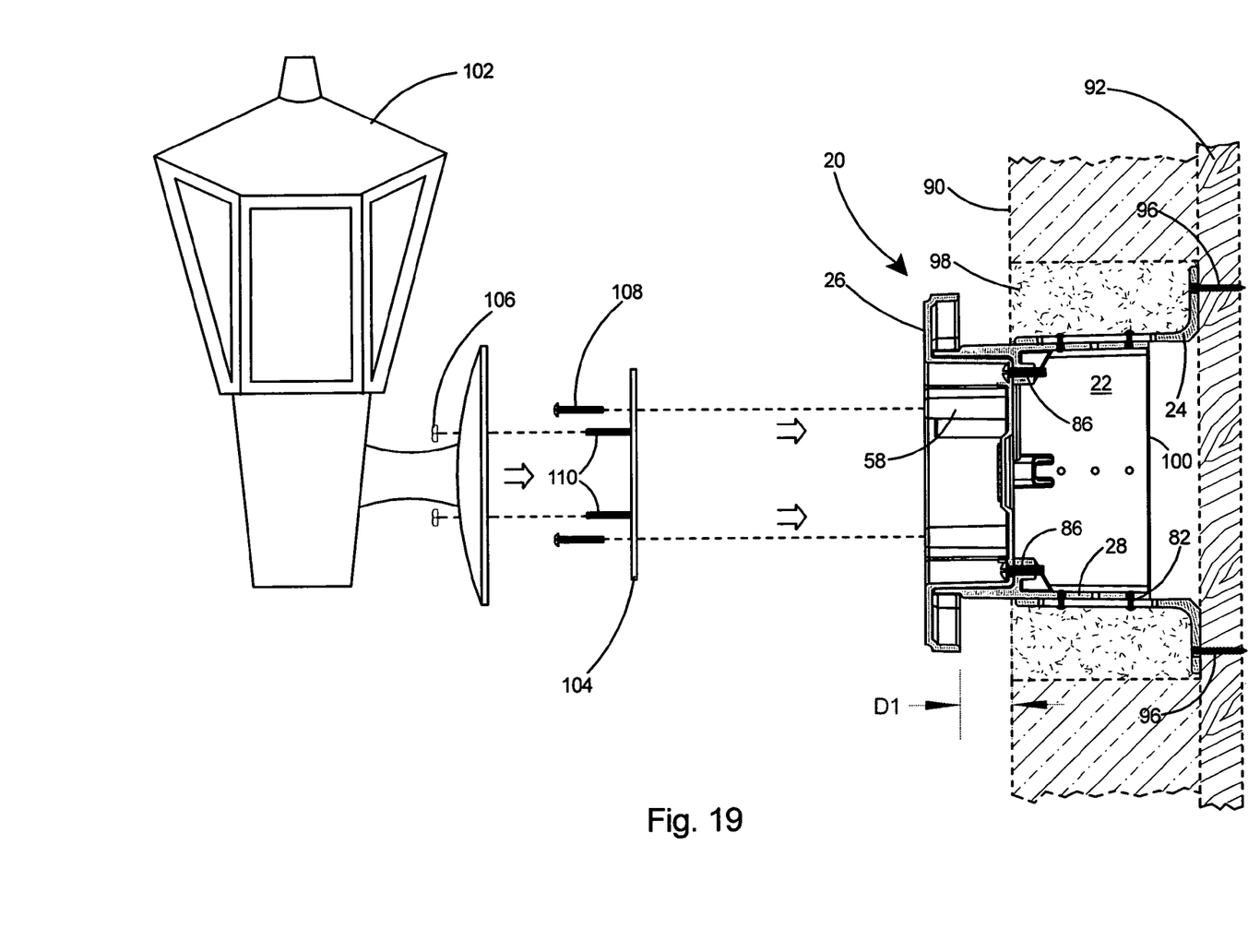
FIG. 19 is a side view of an adjustable electrical box assembly according to the present invention depicting the electrical box installed at a distance D1 offset from the wall.

FIG. 19 depicts an adjustable electrical box assembly 20 according to the present invention installed on a brick wall 90 at an offset from the wall. To offset the electrical box 26 from the wall, anchoring members 24 are secured to the sidewalls 28 of the base member 22 in such a manner that the base legs 72 extend behind the rear edge 100 of the base member 22. The light fixture 102 is therefore installed at an offset distance D1 from the wall 90. After the adjustable electrical box assembly 20 has been secured to the wall 90, the space between the brick wall 90 and the base member 22 is filled with mortar 98.

In the present invention, although it may be constructed of metal, the base member 22 is preferably molded in one piece of plastic. The electrical box 26 may also be constructed of metal but preferably is molded in one piece of plastic.

Having thus described the invention with reference to a preferred embodiment, it is to be understood that the invention is not so limited by the description herein but is defined as follows by the appended claims.

What is claimed is:

1. An adjustable electrical box assembly comprising:
   a base member including sidewalls, a top wall, and a lip extending from said top wall;
   one or more anchoring members;
   a first attachment arrangement for securing said anchoring member to said base member;
   an electrical box including sidewalls, a back wall, and a peripheral flange;
   a second attachment arrangement for securing said electrical box to said base member;
   a third attachment arrangement for securing said adjustable electrical box assembly to a wall substrate;
   an apron integral with and extending rearward from said peripheral flange of said electrical box; and
   an electrical enclosure defined by said sidewalls and said back wall.

2. The adjustable electrical box assembly of claim 1 including
   a plurality of apertures in said sidewalls of said base member; and
   said apertures aligned longitudinally along said sidewalls of said base member.

3. The adjustable electrical box assembly of claim 1 including
   an inner periphery on said lip of said base member;
   one or more bosses integral with said lip; and said bosses arranged around said inner periphery of said lip.

4. The adjustable electrical box assembly of claim 3 including a bore in each of said bosses.

5. The adjustable electrical box assembly of claim 3 including apertures in said back wall of said electrical box.

6. The adjustable electrical box assembly of claim 5 wherein
said sidewalls of said electrical box are telescopically received within said lip of said base member; and
said second attachment arrangement includes fasteners for securing through said apertures in said back wall of said electrical box into said bosses of said base member.

7. The adjustable electrical box assembly of claim 6 wherein said peripheral flange of said electrical box extends laterally substantially beyond said sidewalls of said base member when said electrical box is secured to said base member.

8. The assembly of claim 1 wherein
said base member is molded in one piece of plastic;
said electrical box is molded in one piece of plastic; and
said anchoring member is formed in one piece of plastic or metal.

9. An adjustable electrical box assembly comprising:
a base member including sidewalls, a top wall, and a lip extending from said top wall;
one or more anchoring members;
a first attachment arrangement for securing said anchoring member to said base member;
an electrical box including sidewalls, a back wall, and a peripheral flange;
a second attachment arrangement for securing said electrical box to said base member;
a third attachment arrangement for securing said adjustable electrical box assembly to a wall substrate;
a plurality of tabs extending outward from said sidewalls of said base member;
said tabs aligned in columns along said sidewalls of said base member;
said columns of tabs including a tab on each side of said line of apertures; and
a longitudinal gap along said sidewalls between said columns of tabs.

10. The adjustable electrical box assembly of claim 9 wherein said anchoring member is substantially L-shaped and includes
a base leg and a side leg;
a base slot arranged laterally in said base leg; and
a slot arranged longitudinally in said side leg.

11. The adjustable electrical box assembly of claim 9 wherein
said anchoring member is slideable within said gap between said tabs; and
said first attachment arrangement includes a fastener for securing said side leg of said anchoring member to said sidewall of said base member; and
the distance of said base leg from said top edge of said lip may be varied and selected to arrange for the desired offset of said base member from a wall.

12. The adjustable electrical box assembly of claim 9 wherein said third attachment arrangement includes a fastener for engaging through said base slot in said base leg of said anchoring member and thereby securing said adjustable electrical box assembly to a wall.

13. An adjustable electrical box assembly comprising:
a base member including sidewalls, a top wall, and a lip extending from said top wall;
one or more anchoring members;
a first attachment arrangement for securing said anchoring member to said base member;
an electrical box including sidewalls, a back wall, and a peripheral flange;
a second attachment arrangement for securing said electrical box to said base member;
a third attachment arrangement for securing said adjustable electrical box assembly to a wall substrate;
a plurality of tabs extending outward from said sidewalls of said base member;
a plurality of bosses integral with and extending from said sidewalls of said electrical box;
bores in said bosses; and
one or more removable wall sections in said back wall of said electrical box, said removable wall sections forming knockouts in said back wall of said electrical box.

14. The adjustable electrical box assembly of claim 13 wherein said bores in said bosses of said electrical box are capable of receiving fasteners there through from the bracket of an electrical fixture for securing the electrical fixture to said adjustable electrical box assembly.

* * * * *